May 16, 1967 L. L. ASHLEY 3,319,974
TOWING DEVICE
Filed Oct. 8, 1965

INVENTOR.
LARRY L. ASHLEY

BY *Kimmel, Crowell & Weaver*
ATTORNEYS.

United States Patent Office 3,319,974
Patented May 16, 1967

3,319,974
TOWING DEVICE
Larry L. Ashley, 945 S. Pacific Highway,
Woodburn, Oreg. 97071
Filed Oct. 8, 1965, Ser. No. 494,218
4 Claims. (Cl. 280—43.21)

This invention relates to a device upon which the drive wheels of a vehicle may be placed so that the vehicle may be towed without injury to the drive mechanism thereof.

It is known in the art of towing vehicles that the drive wheels of a vehicle must be rendered inoperable during towing in order to avoid damage to the differential or transmission. This is manifested in the towing of a passenger car by lifting the rearward end of the vehicle off the ground by the towing truck which is usually provided with a hoist or the like. Difficulties arise when the towed vehicle is of the same size or larger than the towing vehicle which results in the instability of the towing vehicle during travel. Attempts have been made in the prior art to provide a towing dolly by which the rearward end of a towed vehicle may be raised without the necessity for a hoist mechanism on the towing vehicle. These devices are characterized by a plurality of ground engaging wheels and a support means on which the wheels of the towed vehicle are placed. The devices known to the prior art are characterized by many disadvantages, one of which is that they are bulky and incapable of compact storage. This requires an extraordinarily large towing vehicle which may accommodate the dolly or a towing device by which the dolly may be transported along the highway when empty.

It is an important object of this invention to provide a towing dolly which may be readily disassembled for compact storage, such as in the rear end of a pickup truck.

Another object of this invention is to provide a towing dolly which is so constructed and arranged that a towed vehicle may be driven onto the dolly.

It is another object of this invention to provide a towing dolly which is constructed and arranged so that the dolly may be assembled about the wheels of the towed vehicle when the towed vehicle is immobile.

Still another object of the instant invention is to provide a towing dolly which may be operated to readily raise its ground engaging wheels.

A further object of the instant invention is to provide a towing dolly which is operable first to raise its ground engaging wheels on one side of a towed vehicle and then operable to raise the ground engaging wheels on the other side of the towed vehicle.

A further object of this invention is to provide a durable, inexpensive and readily maintainable towing dolly.

Another object of this invention is to provide a towing dolly which is laterally expansible to accommodate vehicles of varying width.

Other objects and advantages of the instant invention reside in the combinations of elements, arrangements of parts and features of construction and operation, some of which will be apparent and some of which will be more fully pointed out hereinafter and disclosed in the accompanying drawings wherein there is shown a preferred embodiment of this inventive concept.

Figure 1:
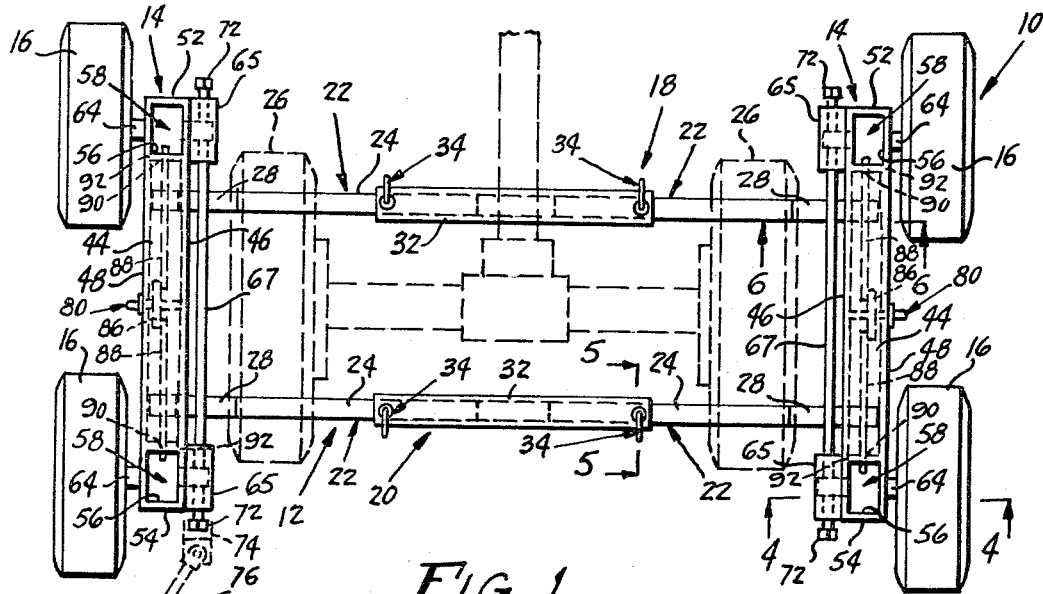
FIGURE 1 is a plan view of the towing dolly of the instant invention with the drive wheels of a towed vehicle and a crank handle being shown in dotted lines.
Figure 2:
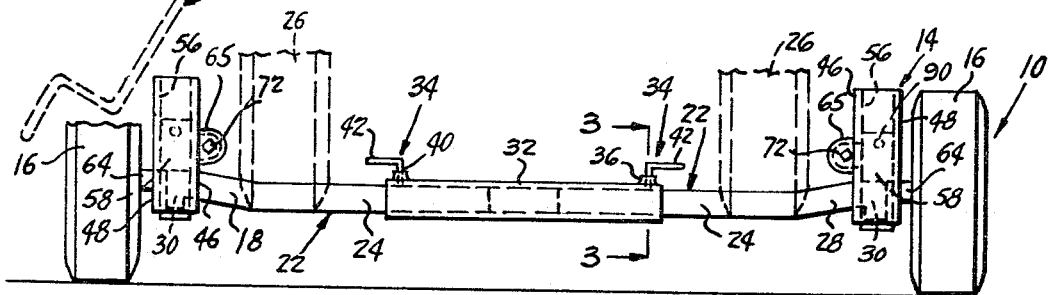
FIGURE 2 is a rear elevational view of the towing dolly of FIGURE 1, certain parts being broken away for purposes of clarity.

Referring now to the drawings in detail, wherein like reference characters designate like elements throughout the several views thereof, there is indicated generally at 10 a towing dolly comprising a support means indicated generally at 12 for receiving the drive wheels of a towed vehicle and a pair of laterally spaced connections shown generally at 14 which rotatably carry a plurality of ground engaging wheels 16.

Support means 12 includes a forward support bar indicated generally at 18 and a substantially identical rearward support bar shown generally at 20. Each of support bars 18, 20 includes a pair of substantially identical arms indicated generally at 22 having an inward substantially horizontal portion 24 receiving a pair of drive wheels 26 of a towed vehicle and an outwardly disposed upwardly inclined section 28 having a vertically depending lug 30 on the outer end thereof for securement in connecting means 14.

Each of support bars 18, 20 includes an inwardly disposed sleeve 32 configured to slidingly receive the inner ends of horizontal portions 24 of arms 22. Sleeve 32 is equipped with a plurality of securing means indicated generally at 34 for fixing the position of each arm 22 in sleeve 32. Although any type of conventional securing means may be used to fix arm 22 in sleeve 32, securing means 34 is illustrated as including a threaded aperture 36 in the upper surface of sleeve 32 and a set screw 38 having a threaded portion 40 for insertion into threaded aperture 36 and a handle 42 perpendicular to threaded portion 40.

It should be apparent that the width of support means 12 may be controlled within certain limits by releasing securing means 34 and sliding arms 22 inwardly or outwardly of sleeve 32. Likewise arms 22 and sleeves 32 may be of any desired cross-section.

As shown in FIGURE 1, each of connecting means 14 is a mirror image of the other and comprises an upper wall 44, an inner wall 46, an outer wall 48, a lower wall 50, a forward end wall 52 and a rearward end wall 54, thus providing an elongate rectangular shaped casing. Upper wall 44 of connecting means 14 provides a rectangular aperture 56 at each end thereof for the reception of a rectangular block shown generally at 58. Rectangular block 58 provides on its inner surface a series of parallel horizontal indentations 60 which comprise a rack for engagement with a pinion gear shown generally at 62 as more fully explained hereinafter.

Figures 4, 5:
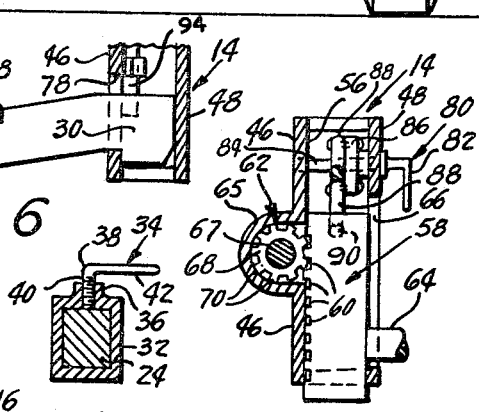
FIGURE 4 is a cross-sectional view of the elevating mechanism of the instant invention taken along line 4—4 of FIGURE 1 and viewing in the direction of the arrows.
FIGURE 5 is a cross-sectional view of the laterally expansible connection of the instant invention taken along line 5—5 in FIGURE 1 and viewing in the direction of the arrows.

On its outer surface, rectangular block 58 provides an outwardly extending stub axle 64 which extends through a vertical slot 66 in outer wall 48 of casing 14 as shown in FIGURE 4. As is evident, slot 66 lies in a vertical plane intersecting aperture 56 and provides a guide means for block 58. Each of wheels 16 is rotatably mounted on stub axle 64 in any conventional manner.

Figure 3:
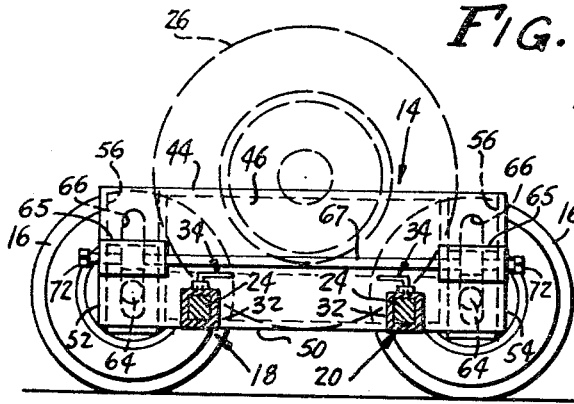
FIGURE 3 is a longitudinal cross-sectional view of the towing dolly, taken along line 3—3 of FIGURE 2 viewing in the direction of the arrows.

Pinion gear 62 is mounted in a housing 65 secured to inner wall 46 intermediate the vertical extent thereof and includes an inner shaft 67 on which is mounted a cylindrical body 68 having a plurality of parallel teeth 70 on the periphery thereof for engagement with indentations 60 of block 58. As shown in FIGURES 1 and 3, shaft 67 extends throughout the length of connecting means 14 and provides for the simultaneous operation of rack 60 and pinion 62 of the elevating means at each end of connecting means 14. The ends of shaft 67 are provided with an enlarged regular geometrically configured head 72 which may be received by socket 74 of a conventional crank indicated at 76.

As is apparent, the rotation of shaft 67 in a clockwise direction as viewed in FIGURE 4 results in the downward movement of rectangular block 58 and consequently in the lowering of wheel 16. In the operation of towing dolly 10, drive wheels 26 are positioned on support means 12 as more fully explained hereinafter, with crank handle 76 being used to lower wheels 16. Conveniently, an operator may lower wheels 16 on one side of towing dolly 10 and then lower wheels 16 on the other side. As an additional feature, a reciprocable pin 94 may be provided to engage sections 28 of arms 22 substantially rigidly securing arms 22 and connections 14 together.

After an attendant has lowered wheels 16 of dolly 10 on one side of the vehicle to be towed, a latch means 80 may be utilized to lock block 58 and gear 62 in place. Latch means 80 includes an operating handle 82, which may be of any length desired, connected at right angles to a pin 84 rotatably received by inner and outer walls 46, 48 and fixedly connected to a rod advancing wheel 86. Eccentrically pivotally mounted on opposite sides of wheel 86 is a pair of locking rods 88 which may be retracted by rotating handle 82 until the junctions of rods 88 and wheels 86 lie in a vertical plane. By rotating wheel 86 until these junctions are horizontal, rods 88 may be advanced to engage block 58.

Each of blocks 58 preferably forms an indentation or blind opening 90 adjacent the upper end thereof receiving the terminal end of rods 88 when they are located in the extended position. A transverse plate 92 may be provided above the path of travel of rods 88 to facilitate the retention of rods 88 in openings 90.

Figure 6:
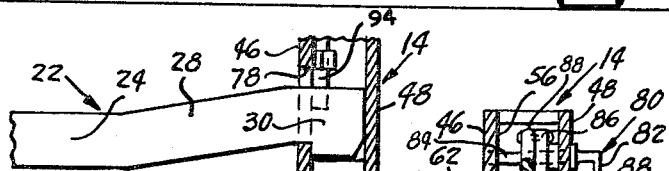
FIGURE 6 is a cross-sectional view of the releasable connection of the instant invention taken along line 6—6 of FIGURE 1.

The connection between support means 12 and connecting means 14 is shown in FIGURE 6 and comprises a slot 78 located in inner wall 46 of connecting means 14 through which depending leg 38 is placed. The underside of upwardly inclined portion 28 of arm 22 and the lower surface of slot 78 provides the load carrying connection sufficient to carry a towed vehicle. As is apparent from FIGURE 6, arm 22 may be removed from connecting means 14 by lifting upwardly thereon such that lug 30 may be moved through slot 78.

The first mode of placing a towed vehicle in towing dolly 10 includes the assembly of dolly 10 rearwardly of the vehicle to be towed, placing wedges or the like rearwardly of wheels 16 to prevent the rearward movement of dolly 10 and then backing the vehicle to be towed over support bar 18 such that drive wheels 26 thereof rest on support bars 18, 20 as shown in FIGURE 1. Crank 76 is then utilized to lower wheels 16 on one side of dolly 10 and then to lower wheels 16 on the other side.

Another mode of utilizing dolly 10 is particularly advantageous when the vehicle to be towed is immobile. Support bars 18, 20 are placed forwardly and rearwardly of drive wheels 26. Connecting means 14 are then attached to support bars 18, 20 by the engagement of lug 30 in slot 78 as previously described. Crank 76 is then utilized to lower wheels 16 which are then latched in position. As is apparent, this method of using dolly 10 provides a means of raising the drive wheels of a vehicle which is totally immobilized, such as may be the result of a locked differential or transmission.

It is now seen that there is herein provided an improved towing dolly having all of the advantages of the instant invention and others, including many advantages of great practical utility and commercial importance.

Since many embodiments may be made of the instant invention, and since many modifications of the embodiment hereinbefore shown and described may be made, it is understood that the foregoing is to be interpreted merely as illustrative and not in a limiting sense.

I claim:

1. A towing dolly comprising support means including a pair of parallel spaced apart support bars having two end portions and a longitudinal axis at right angle to the direction of intended travel adapted to receive the drive wheels of a vehicle to be towed; a connection means positioned adjacent each of said end portions of said support bars including at least one stub axle having a longitudinal axis substantially parallel to the axes of said support bars; ground engaging wheel means mounted on said stub axle providing surface in a direction substantially perpendicular to said axes, means releasably securing said support bars to said connecting means; and elevating means operably connecting said support means with said wheel means for raising and lowering said support means with respect to said wheel means; wherein said connecting means including a casing providing a vertical slot, said stub axle being positioned within said slot, a block member secured on an end of said stub axle within said casing, said block member being vertically slidably mounted within said casing, said elevating means being connected between said block and said casing for raising and lowering said wheel means.

2. The structure of claim 1 wherein said block member provides a series of parallel indentations forming a rack, said elevating means including said rack and a gear mounted on said casing in engagement with said indentations for reciprocating said block member within said casing.

3. The structure of claim 2 wherein each of said connecting means provides two spaced apart stub axles, and said elevating means includes a rod fixedly connecting the elevating means secured to stub axles of said connecting means for simultaneous raising and lowering of said support means.

4. A towing dolly comprising
support means having an axis at right angles to the intended direction of travel and two end portions substantially parallel to the direction of travel adapted to receive the drive wheels of a vehicle to be towed;
connecting means positioned adjacent each of said end portions of said support means including at least one stub axle;
ground engaging wheel means mounted on said stub axle providing rolling contact with an underlying horizontal surface in the direction of travel;
means securing said support means to said connecting means; and
elevating means operably connected to said connecting means and said stub axle for raising and lowering said support means with respect to said wheel means.

References Cited by the Examiner
UNITED STATES PATENTS

| | | | |
|---|---|---|---|
| 1,122,056 | 12/1914 | Athman | 280—43.21 |
| 1,778,654 | 10/1930 | Wright | 280—79.1 |
| 1,782,610 | 11/1930 | Green | 280—43.21 |
| 2,556,121 | 6/1951 | Thomas | 280—34 X |
| 2,937,879 | 5/1960 | Lion | 280—43.21 |
| 2,943,863 | 7/1960 | Corey et al. | 280—79.1 |
| 3,066,946 | 12/1962 | Nelson | 280—79.1 |
| 3,241,851 | 3/1966 | Dingbaum | 280—34 |

MILTON BUCHLER, *Primary Examiner.*

C. C. PARSONS, *Assistant Examiner.*